Oct. 30, 1923.

G. L. GAY 1,472,163

PAN GREASING MACHINE

Filed April 14, 1922   3 Sheets-Sheet 1

INVENTOR
George L. Gay
By W. W. Williamson
Atty

Oct. 30, 1923.

G. L. GAY 1,472,163

PAN GREASING MACHINE

Filed April 14, 1922      3 Sheets-Sheet 3

INVENTOR
George L. Gay
By W. W. Williamson Atty.

Patented Oct. 30, 1923.

1,472,163

UNITED STATES PATENT OFFICE.

GEORGE L. GAY, OF PHILADELPHIA, PENNSYLVANIA, ASSIGNOR TO WILLIAM C. McTARNAHAN AND NORMAN STEVENSON, BOTH OF BOSTON, MASSACHUSETTS.

PAN-GREASING MACHINE.

Application filed April 14, 1922. Serial No. 552,779.

*To all whom it may concern:*

Be it known that I, GEORGE L. GAY, a citizen of the United States, residing at Philadelphia, in the county of Philadelphia and State of Pennsylvania, have invented new and useful Improvements in Pan-Greasing Machines, of which the following is a specification.

My invention relates to new and useful improvements in pan greasing machines, especially adapted for use in combination with the device described in a co-pending application numbered serially 425,543, filed November 20th, 1920, now Patent No. 1,443,407 and has for its particular object to provide means for drawing off the greasy vapors arising during the operation of the machine and to also expel the excess or residue vapors from the pans as they are withdrawn from the atomizers.

A further object of the invention is to provide a hood disposed above the atomizers of the pan greasing machine into which the pans are moved for the greasing operation, to provide a plurality of conduit pipes, preferably three in number, leading from the rear wall of said hood and all connected with a header which in turn is connected with the intake side of a suitable blower preferably located within the body of the machine, said blower having an outlet pipe leading from the exhaust end thereof to some suitable point for disposal of the greasy vapors such as the atmosphere outside of a building and to provide said outlet pipe with a branch controlled by a suitable damper leading back into the machine and having suitable outlets leading therefrom and arranged at an angle for projecting the air upwardly and rearwardly toward the aforementioned hood whereby the residue excess grease vapors will be expelled from the pan as they are withdrawn from the atomizers, said vapors being driven into the hood so as to be exhausted to the atmosphere.

With these ends in view, this invention consists in the details of construction and combination of elements hereinafter set forth and then specifically designated by the 'claims.

In order that those skilled in the art to which this invention appertains, may understand how to make and use the same, I will describe its construction in detail, referring by numerals to the accompanying drawings forming a part of this application, in which:—

Figure 1:
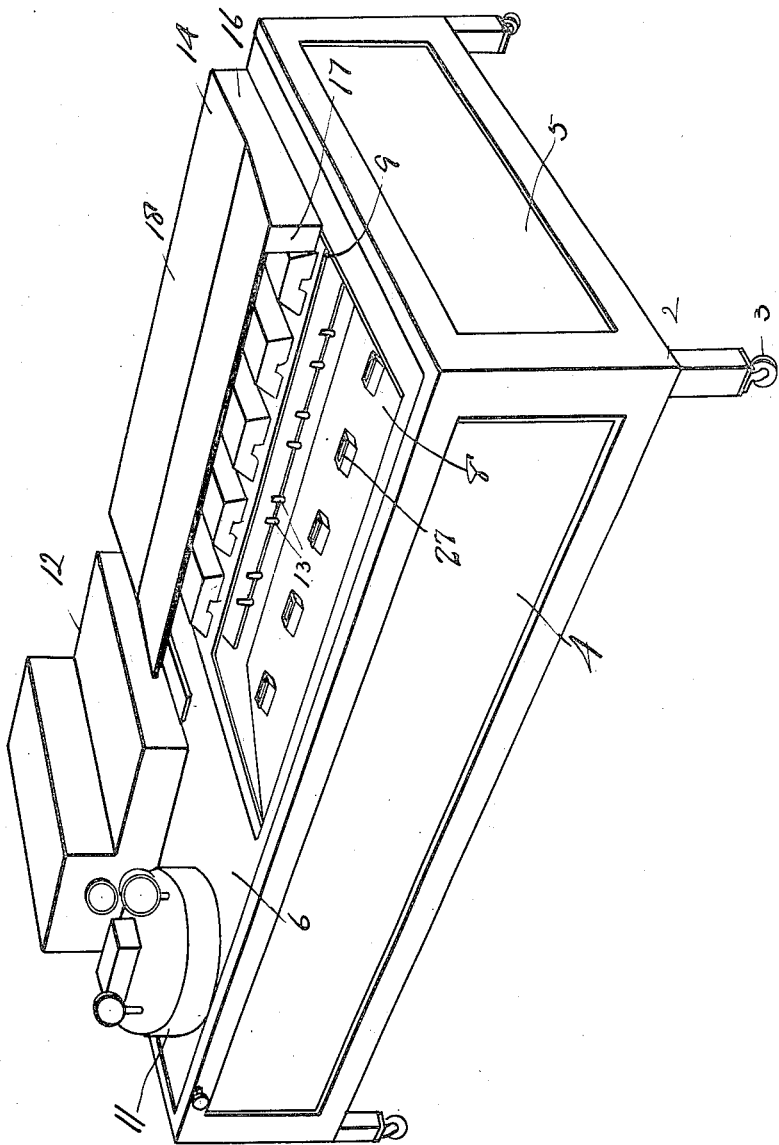
Fig. 1, is a perspective view of a pan greasing machine showing the application of my improvement.

In carrying out my invention as here embodied, 2 represents the frame of the machine preferably supported on casters 3 in order that the machine may be readily transported from place to place and to this frame are secured the sides 4, end walls 5 and top 6, the latter having an opening 8 for the reception of the movable pan holding frame 9 on which are suitably mounted pans 10. The air and grease reservoirs 11 and 12 respectively may be located in any suitable part of the machine and are suitably connected with the atomizers 13 whereby the grease may be distributed over the insides of the inverted pans as said pans are moved from said atomizers.

On the top of the machine in the region of the atomizers so as to be disposed above the latter and partly enclosing them is mounted a hood 14 consisting of a rear wall 15, end walls 16, short front walls 17 spaced to provide a passageway for the pans and their movable holding frame and a top wall 18 the forward portion of which is inclined from a point intermediate the ends of the end walls toward the front portion of said hood, the inclined portion of said top wall assisting in guiding the vapors arising at the front of the hood toward the rear thereof.

Figure 2:
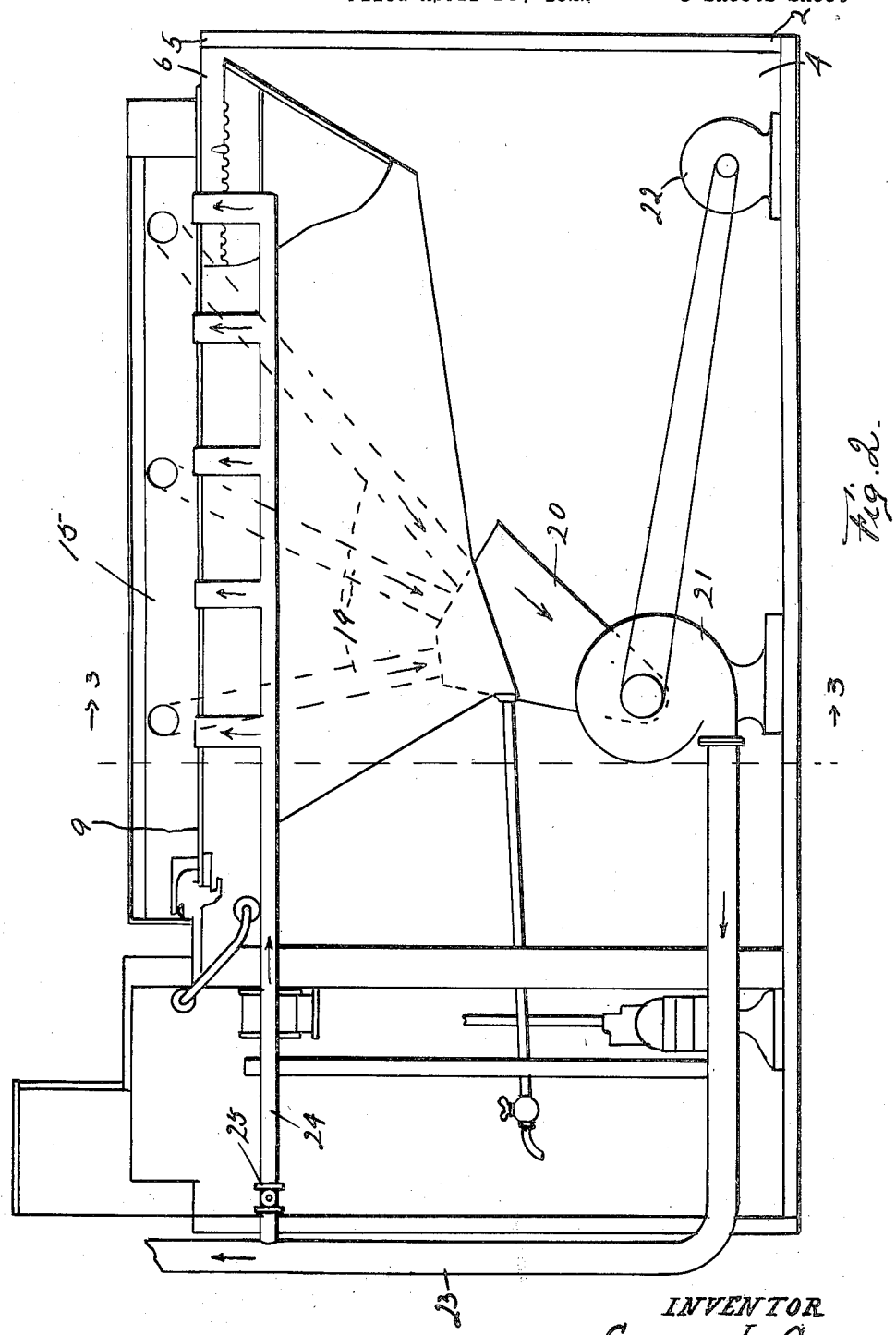
Fig. 2, is a side elevation thereof with the near side wall and other portions removed and certain parts broken away and shown in section.
Figure 3:
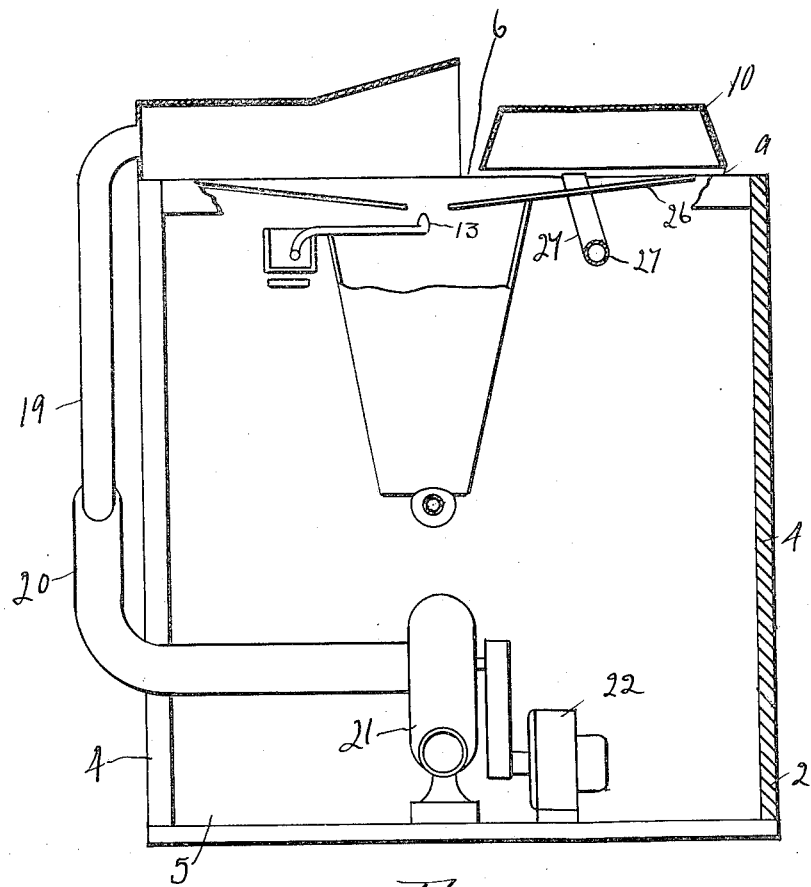
Fig. 3, is a section at the line 3—3 of Fig. 2.

From the rear portion of the hood lead a plurality of conduit pipes 19 preferably three in number as will be noted by reference to Fig. 2 and these pipes are fastened in the rear wall of the hood in any suitable or well known manner and all of them connect with the header or manifold 20 which is connected with the intake side of a suitable blower 21 preferably located within the body of a machine and mounted on some suitable portion of the frame, said blower being actuated in any suitable manner as through the medium of a motor 22 suitably connected therewith.

The exhaust end of the blower 21 is connected to an outlet pipe 23 leading to some suitable point of disposal for the grease vapors drawn out of the hood, said point of disposal generally being the atmosphere on the outside of the building.

Connected to the outlet pipe 23 at some suitable point is a return pipe 24 of smaller diameter relative to the outlet pipe and the amount of air passing through said return pipe is controlled by a damper represented at 25 and this return pipe leads back into the body of the machine beneath one of the baffle plates or aprons 26 and from this return pipe lead a number of outlets 27 arranged at a suitable angle so as to project air upwardly and rearwardly toward the hood or in other words said outlets are inclined to the vertical center of the machine. There is preferably one of these outlets for each pan that is being greased and are located in the paths of travel of said pans so that as said pans are withdrawn from the atomizers and out of the hood the air issuing from said outlets will blow any excess or residue vapor from the pans toward or into said hood from which point they will be drawn off through the conduit pipes 19 as will be obvious.

It has been found in actual practice that the use of three conduit pipes leading from the rear wall of the hood produce a much better drag than if located in other positions, especially in the top of the hood, and therefore prevent the escape of any of the excess grease vapors.

Of course I do not wish to be limited to the exact details of construction as herein shown as these may be varied within the limits of the appended claims without departing from the spirit of my invention.

Having thus fully described my invention, what I claim as new and useful is:—

1. A pan greasing machine having a hood, a passage-way for the pans to move into and out of the hood, atomizers in position to spray the pans while covered by the hood, an exhaust outlet from the hood, means for causing a suction of the vapors out from within the hood through said outlet, and an air nozzle which is so positioned as to discharge into the pans as they are moved out from the hood to blow any remaining vapor in the pans back into the hood toward the exhaust outlet therefrom.

2. A pan greasing machine having a hood, a passage-way for the pans to move in inverted position into and out of the hood, atomizers in position to spray the pans while covered by the hood, an exhaust outlet from the hood, means for causing a suction of the vapors out from within the hood through said outlet, and an air nozzle located below the path of travel of the pans at the front of the hood which is so positioned as to discharge upwardly and rearwardly into the inverted pans as they are moved out from the hood to blow any remaining vapor in the pans back into the hood toward the exhaust outlet therefrom.

3. A pan greasing machine having a hood open at the front and closed on the other sides and at the top, a passage-way for the pans to move into and out of the hood through said open front, atomizers in position to spray the pans when they are within the hood, a blower, outlet pipes which lead from the rear part of the hood to the intake of the blower, an outlet pipe which leads from the exhaust port of the blower and has a main discharge outlet, and a branch pipe which is connected with said exhaust pipe intermediate its ends and is provided with outlets below the path of travel of the pans at the front of the hood which discharge upwardly and rearwardly into the pans so as to blow the residue of vapor from the pans toward the exhaust pipe at the back of the hood.

4. A pan greasing machine having a hood open at the front and closed on the other sides and at the top, a passage-way for the pans to move into and out of the hood through said open front, atomizers in position to spray the pans when they are within the hood, a blower, outlet pipes which lead from the rear part of the hood to the intake of the blower, an outlet pipe which leads from the exhaust port of the blower and has a main discharge outlet and a branch pipe which is connected with said exhaust pipe intermediate its ends and is provided with outlets below the path of travel of the pans at the front of the hood, said outlets extending upwardly and rearwardly at an angle to the vertical centre of the machine and discharging into the pans so as to blow the residue of vapor from the pans toward the exhaust pipe at the back of the hood.

In testimony whereof, I have hereunto affixed my signature.

GEORGE L. GAY.